United States Patent
Armangau et al.

(10) Patent No.: US 9,779,023 B1
(45) Date of Patent: Oct. 3, 2017

(54) STORING INLINE-COMPRESSED DATA IN SEGMENTS OF CONTIGUOUS PHYSICAL BLOCKS

(71) Applicant: EMC Corporation, Hopkinton, MA (US)

(72) Inventors: Philippe Armangau, Acton, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/755,164

(22) Filed: Jun. 30, 2015

(51) Int. Cl.
*G06F 12/08* (2016.01)
*G06F 12/0875* (2016.01)
*G06F 12/02* (2006.01)

(52) U.S. Cl.
CPC ........ *G06F 12/0875* (2013.01); *G06F 12/023* (2013.01); *G06F 2212/1044* (2013.01); *G06F 2212/452* (2013.01)

(58) Field of Classification Search
CPC ............... G06F 12/0875; G06F 12/023; G06F 2212/1044; G06F 2212/452
See application file for complete search history.

(56) References Cited

U.S. PATENT DOCUMENTS

| | | | | |
|---|---|---|---|---|
| 5,526,482 A | * | 6/1996 | Stallmo | G06F 11/1076 |
| | | | | 711/E12.04 |
| 5,701,516 A | * | 12/1997 | Cheng | G06F 12/0804 |
| | | | | 710/22 |
| 7,058,783 B2 | * | 6/2006 | Chandrasekaran | G06F 3/0608 |
| | | | | 707/999.101 |
| 8,190,850 B1 | * | 5/2012 | Davenport | G06F 17/30067 |
| | | | | 711/170 |
| 8,478,731 B1 | * | 7/2013 | Throop | G06F 17/30153 |
| | | | | 707/693 |
| 2003/0005189 A1 | * | 1/2003 | Wilson | G06F 13/387 |
| | | | | 710/33 |
| 2004/0228533 A1 | | 11/2004 | Adelmann | |
| 2006/0193470 A1 | | 8/2006 | Williams | |
| 2007/0073941 A1 | * | 3/2007 | Brink | G06F 3/0608 |
| | | | | 710/68 |
| 2010/0114843 A1 | | 5/2010 | Farrar et al. | |
| 2010/0274926 A1 | * | 10/2010 | Marulkar | H03M 7/30 |
| | | | | 709/247 |
| 2014/0310476 A1 | * | 10/2014 | Kruus | G06F 12/0871 |
| | | | | 711/133 |

OTHER PUBLICATIONS

Yannis Klonatos, Thanos Makatos, Manolis Marazakis, Michail D. Flouris, and Angelos Bilas. 2012. Transparent Online Storage Compression at the Block-Level. Trans. Storage 8, 2, Article 5 (May 2012), 33 pages.*

* cited by examiner

*Primary Examiner* — David X Yi
*Assistant Examiner* — Ramon A Mercado
(74) *Attorney, Agent, or Firm* — BainwoodHuang

(57) ABSTRACT

Techniques for storing data received by a data storage system involve performing inline compression on received data and storing resulting compressed data in segments of contiguous physical address space of a file system. Each segment spans multiple contiguous physical addresses and stores data of multiple contiguous logical addresses of a file. Each segment has an extent list that provides a location within that segment of the compressed data for each logical address.

17 Claims, 6 Drawing Sheets

| Block Pointers 162 | | | |
|---|---|---|---|
| Compressed? | Ref Count | Segment Offset | FSBN |
| N | 100 | | $a$ |
| Y | 100 | 0 | $x$ |
| Y | 100 | 0 | $x$ |
| Y | 100 | 0 | $x$ |
| ... | | | |
| N | 100 | | $b$ |

FIG. 3

| Extent List 184 | |
|---|---|
| Position | Length |
| 512 | 1147 |
| 1660 | 1771 |
| 3432 | 2324 |
| ... | |

FIG. 4

STORING INLINE-COMPRESSED DATA IN SEGMENTS OF CONTIGUOUS PHYSICAL BLOCKS

BACKGROUND

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Some data storage systems employ compression technology to better utilize storage resources on the non-volatile storage devices. Compression enables the data storage system to store more data in the same amount of non-volatile storage. A conventional approach to compressing data involves the data storage system operating in the background to compress data stored in the non-volatile storage devices.

SUMMARY

Unfortunately, there are deficiencies with the above-described conventional approach. For example, background compression requires storage of uncompressed data prior to compression. Thus, there is an over-commitment of storage resources before any savings in storage can be realized. Moreover, background compression may entail reading previously written data from persistent storage and rewriting compressed data back to persistent storage. Thus, background compression can significantly increase disk IO traffic.

In contrast with the above-described conventional approach to compression, improved techniques for storing data received by a data storage system involve performing inline compression on received data and storing resulting compressed data in segments of contiguous physical address space of a file system. Each segment spans multiple contiguous physical addresses and stores data of multiple contiguous logical addresses of a file. Each segment has an extent list that provides a location within that segment of the compressed data for each logical address.

Advantageously, the improved techniques greatly improve storage utilization by reducing or eliminating the need to store uncompressed data prior to compression. Thus, the improved technique reduces disk I/O traffic by avoiding reads and writes of uncompressed data.

One embodiment is directed to a method of managing data storage in a data storage system. The method includes receiving, by the data storage system over a network, a set of write requests, the set of write requests specifying data to be written to multiple contiguous logical addresses of a file in a file system. The method also includes performing a compression operation on the data being written to the respective logical address, to produce respective portions of compressed data. The method further includes storing the portions of compressed data together within a segment of contiguous physical address space in the file system, the segment having an extent list identifying a location within the segment where each of the portions of compressed data is stored.

Additionally, some embodiments are directed to a system constructed and arranged to manage data storage in a data storage system. The system includes memory and controlling circuitry constructed and arranged to carry out a method of managing data storage in a data storage system.

Further, some embodiments are directed to a computer program product having a non-transitory computer readable storage medium that stores instructions which, when executed by a computer, cause the computer to carry out the method of managing data storage in a data storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3 is a block diagram illustrating example set of block pointers within the electronic environment shown in FIG. 1.

FIG. 4 is a block diagram illustrating an example extent list within the electronic environment shown in FIG. 1.

DETAILED DESCRIPTION

Improved techniques for storing data received by a data storage system involve performing inline compression on received data and storing resulting compressed data in segments of contiguous physical address space of a file system. Advantageously, the improved techniques greatly improve storage utilization by reducing or eliminating the need to store uncompressed data prior to compression.

Figure 1:
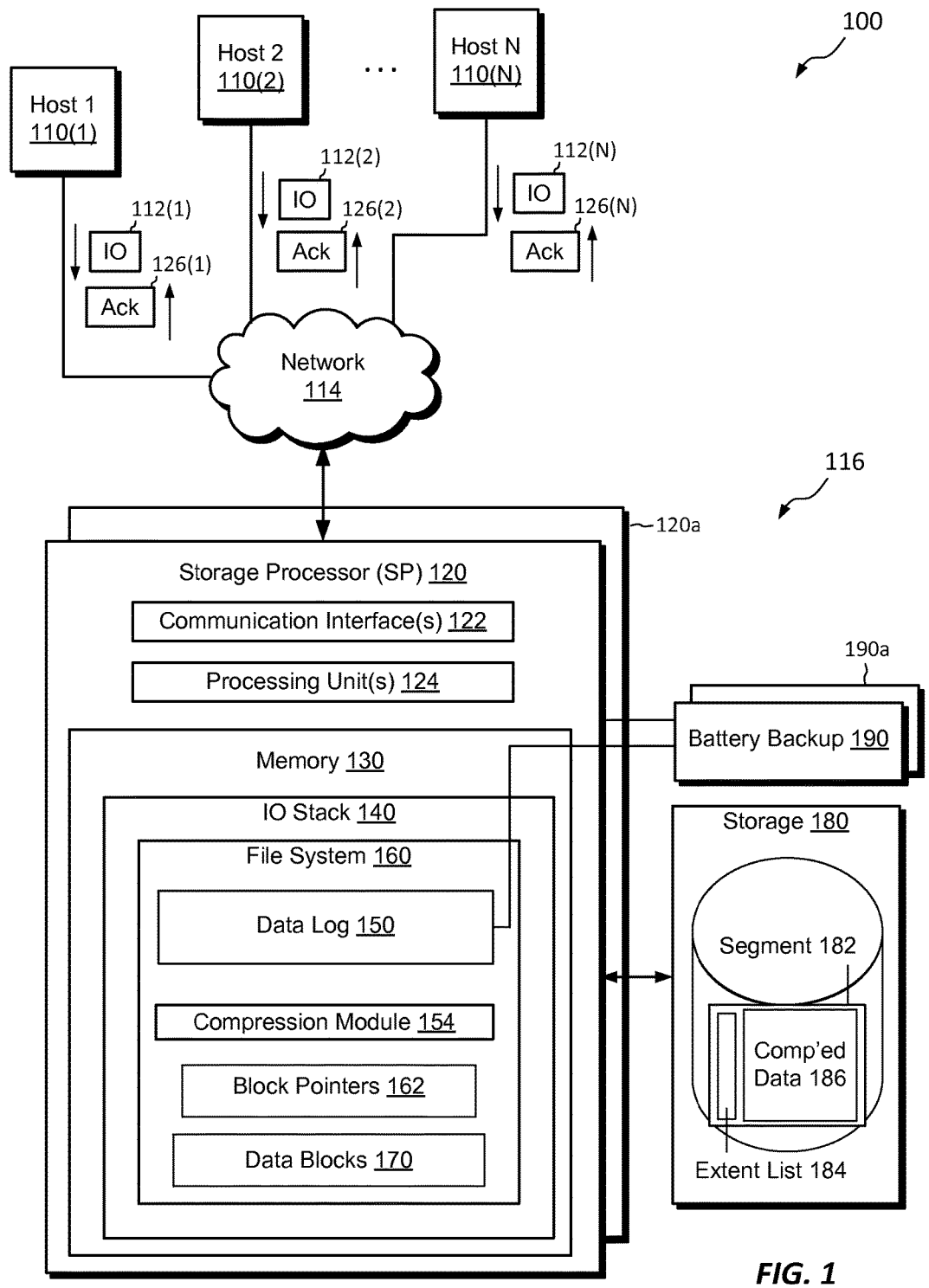
FIG. 1 is a block diagram illustrating an example electronic environment in which the improved technique can be carried out.

FIG. 1 shows an example electronic environment 100 in which embodiments of the improved techniques hereof can be practiced. Here, multiple host computing devices ("hosts") 110(1) through 110(N) access a data storage apparatus 116 over a network 114. The data storage apparatus 116 includes a storage processor, or "SP," 120 and non-volatile storage 180. The storage 180 is provided, for example, in the form of hard disk drives and/or electronic flash drives. The data storage apparatus 116 may include multiple SPs like the SP 120. For instance, the data storage system 116 may include a second SP 120a. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 114 can be any type of network or combination of networks, such as a storage area network (SAN), local area network (LAN), wide area network (WAN), the Internet, and/or some other type of network, for example. In an example, the hosts 110(1-N) can connect to the SP 120 using various technologies, such as Fibre Channel (e.g., through a SAN), iSCSI, NFS, SMB 3.0, and CIFS. Any number of hosts 110(1-N) may be provided, using any of the above protocols, some subset thereof, or other protocols besides those shown. The SP 120 is configured to receive IO requests 112(1-N) and to respond to such IO requests 112(1-N) by reading and/or writing the non-volatile storage 180.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., realize by operation of programming code) an IO stack 140. The IO stack 140 provides an execution path for host IOs (e.g., IO requests 112(1-N)). The IO stack 140 contains, inter alia, a data log 150, a compression module 154, a file system 160, block pointers 162, and data blocks 170. The underlying persistent data and metadata that support the file system 160 typically reside in the storage 180.

Portions of the memory 130 that support the data log 150 may be realized in volatile memory, e.g., DRAM, within SP 120. In an example, the SP 120a has similar DRAM that is configured to mirror the DRAM of the SP 120. The data storage apparatus 116 is also seen to include battery backup 190 and 190a connected to respective SPs 120 and 120a, for powering their respective DRAMs in case of an unexpected loss of power. Hence, the battery backups 190 and 190a make it possible for data in the data log 150 to be deemed persisted even though it may only be stored in volatile memory. Such persistence allows the SP 120 to send acknowledgments 126(1 . . . N) to respective hosts 110(1 . . . N) as soon as data from IO requests 112(1 . . . N) are written to the data log 150 and mirrored to the SP 120a. Such rapid acknowledgments to the IO requests 112(1 . . . N) helps in maintaining a high quality of service for the hosts 110(1 . . . N).

The data log 150 logs data directed to the file system 160 by incoming 10 requests 112. In an example, the data log 150 has a head and a tail and is arranged as a circular buffer. Generally speaking, new log entries into the data log 150 are placed at the tail of the respective log and older log entries are flushed from the head. A log manager (not shown) for data log 150 processes incoming writes to the data log 150 and performs flushing, e.g., on a regular basis and/or in response to the data log 150 reaching a high water mark, to prevent the respective log from becoming full. Flushing a log entry from the data log 150 entails placing the data for that log entry at the appropriate mapped locations within the file system 160, e.g., at the physical addresses indicated by the file system's inodes, indirect blocks, and so forth. Typically, the log manager will flush a cache page of data at a time, a cache page containing the data specified in eight writes.

In the example shown, the data log 150 is embedded within the file system 160 and occupies a known set of physical addresses within the file system 160, such as within a contiguous range of physical addresses. It should be understood, however, that other arrangements do not require the data log 150 to be embedded within the file system 160.

Compression module 154 includes instructions to cause one or more of the processing units 124 to compress data residing in the data log 150 inline.

In an example, the file system 160 is a container file system storing a container file representing a data object, such as a host file system (HFS), a virtual volume (vVol), or a LUN. The SP 120 may host any number of such container file systems. Each such container file system includes a respective inode table. The inode table includes inodes providing file-specific information about each file in the respective container file system. The information stored in each inode includes location information (e.g., block locations) where data of the respective file are stored. It should be understood that any container file system might contain multiple files, with each having its own entry in the respective inode table. In some arrangements, each container file system stores not only a file representing a data object, but also snaps of that file and therefore snaps of the data object the file stores.

It should further be understood that a container file system may be allocated storage from a storage pool in the form of "slices." A "slice" is an increment of storage space, such as 256 MB or 1 GB in size, which is derived from the non-volatile storage 180. The pool may allocate slices to a container file system, e.g., file system 160, for use in storing its files. The pool may also deallocate slices from the container file system if the storage provided by the slices is no longer required. In an example, the storage pool creates slices by accessing RAID groups, dividing the RAID groups into LUNS, and further dividing the LUNs into slices.

The file system 160 has a physical address space of file system block numbers (FSBNs) at which physical blocks in disk reside and are store some amount of data. The block pointers 162 are metadata describing locations of data of a file in the file system 160. For example, the block pointers 162 map the logical addresses specified in write requests to the physical addresses at which the file data is stored within the file system 160. The data storage system organizes block pointers by logical addresses (i.e., logical offsets) within the file.

The data blocks 170 represent storage units in which file data resides. The block pointers 162 point to the locations of the data blocks 170.

During an example operation, the data storage system 116 receives an IO request 112 (e.g., any of 112(1) to 112(N)) from a host (e.g., any of hosts 110(1) to 110(N)). The JO request 112 specifies a set of data to be written to the file system 160, e.g., at a designated logical address. In an example, the IO request 112 specifies the logical address in the form of an FSID (File System Identifier), file ID (directory and file name, or inode number), and logical offset into the specified file. Thus, the logical address provides all the information needed for the data storage system 116 to identify the block or blocks being written. In some examples, the IO request 112 may also specify a replica ID, e.g., in some situations where snaps are provided.

The IO request 112 enters the IO stack 140, which directs the IO request 112 to the data log 150. The log manager for the data log 150 creates a new log entry (a "first" log entry), e.g., at the current tail of the data log 150.

When SPs 120 and 120a have mirrored DRAM with battery backup (190 and 190a), the SP 120 may send acknowledgments 126(1), 126(2), . . . , 126(N) of the write requests to respective hosts once data have been cached and mirrored.

The SP 120 executes the compression module 154 to compress data specified in the write requests and stored in the data log 150. Preferably, the SP 120 should operate the compression module 154 to compress the data specified in the write requests before the data is flushed from the data log 150.

It should be understood that the SP 120 compresses the data specified in the write requests one allocation unit (AU) at a time. A typical AU size in the file system is 8 kB. However, other AU sizes may be used by the file system 160 such as 16 kB, 32 kB, or larger. In some arrangements, the file system 160 supports more than one AU size.

In an example, around the same time that the SP 120 is compressing the data specified by the write requests, i.e., AU-sized chunks, to produce respective portions of compressed data 186, the SP 120 allocates a segment 182 in storage 180 in which to store the portions of compressed data 186. The segment 182 is a contiguous range of physical address space. Sequential portions of compressed data 186 may be stored sequentially in the segment. The segment 182 has an extent list 184 that provides locations of each portion 186 with the segment 182.

Figure 2:
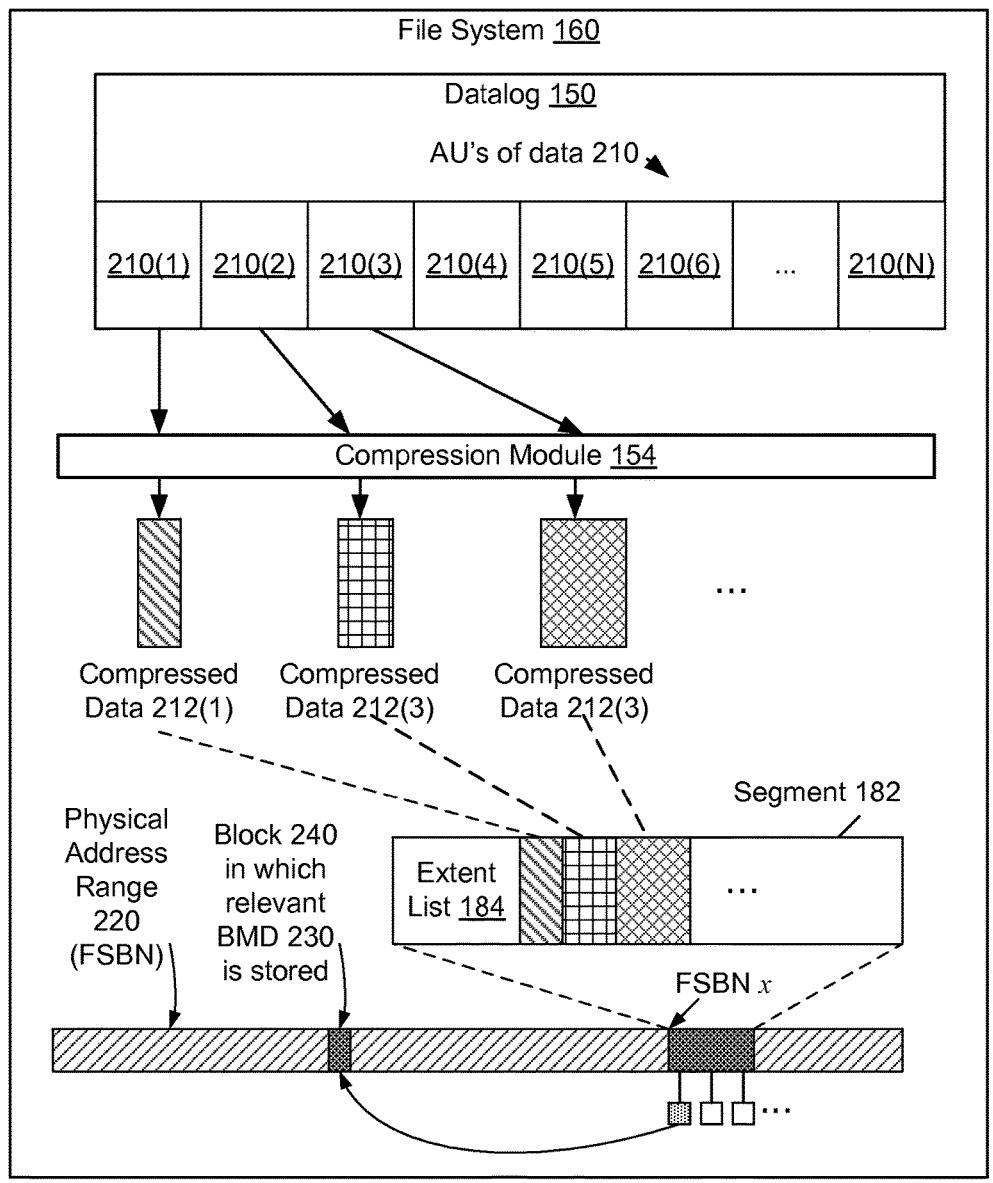
FIG. 2 is a flow chart illustrating an example storage of compressed data in a segment within the electronic environment shown in FIG. 1.

FIG. 2 illustrates the compression and storage process described above in more detail. Specifically, FIG. 2 shows the compression process within the file system 160 with respect to the physical address space 220 provided by the file system 160.

As discussed above, the SP 120 (FIG. 1) stores data specified by write requests in the data log 150 within the file system 160. The data arrives at the SP 120 in AU-sized chunks. As each chunk arrives, the SP 120 writes that chunk to the data log 150.

The compression module 154 then compresses each of the AU-size chunks 210 individually. The result of each compression is a respective portion of compressed data, e.g, the compression of chunk 210(1) results in the portion of compressed data 212(1), the compression of chunk 210(2) results in the portion of compressed data 212(2), the compression of chunk 210(3) results in the portion of compressed data 212(3), and so on. As illustrated in FIG. 2, the portions 212(1), 212(2), and 212(3) may have different sizes.

Around the same time that the SP 120 performs compression on the chunks of data 210 using the compression module 154, the SP 120 also allocates a segment 182 of contiguous physical addresses in the file system 160. As illustrated in FIG. 2, the segment 182 is located within the physical address range 220 of the file system 160 beginning at an address x. Each segment is 8 blocks in size.

The SP 120 establishes a block pointer 162 for each of the portions of compressed data 212, i.e., for each logical address. Each such block pointer 162 points to the address x for, e.g., if the segment includes compressed portions of data for 12 sequential logical addresses, each of the 12 block pointers for those logical addresses point to the same physical address, x. It is the extent list 184 that provides the precise location of a portion of compressed data 212 within the segment 182.

It should be understood that FIG. 2 illustrates the extent list 182 as being at the beginning of the segment 184. However, the extent list 184 may be anywhere in the segment or not in the segment at all.

The address x corresponds to a particular block. This block is representative of the segment 184. Along these lines, the block is the only block for which there is relevant block metadata (BMD). The BMD is the primary BMD 230 of the segment 182. The primary BMD 230 is stored in a physical block 240 and contains metadata describing the block.

It should be understood that each of the other portions of compressed data 212 also have BMDs. However, these BMDs are not relevant to the segment 182 and are therefore referred to as orphan BMDs.

FIG. 3 illustrates an example set of block pointers 162. In an example, these block pointers reside in an indirect block within the file system 160. Each block pointer 162 corresponds to a respective logical address of the file. Each block pointer 162 is an entry having multiple fields. As illustrated in FIG. 3, the fields include (1) a compressed block indicator, (2) a file system block number (i.e., physical address in the file system 160), (3) a reference count, and (4) a segment offset.

In an example, the compressed block indicator is a single bit that indicates whether the block pointer 162 points to compressed data or not.

The file system block number (FSBN) indicates the physical address to which the logical address represented by the block pointer 162 corresponds. In the example shown in FIG. 3, the data that is not compressed are each stored in blocks having respective addresses a and b. However, the data that is compressed are all stored at the same location, x, which is the representative address of the segment.

The reference counts indicate the sharing relationships between files. Reference counts in the block pointers may be compared with other reference counts to determine whether blocks are shared.

The segment offset applies to a situation in which the segment 182 is larger than a cache page size, i.e., multiples of the cache page size. In this case, the offset denotes which multiple of the cache page the portion of compressed data 212 resides.

It should be understood that, in the example illustrated in FIG. 3, the reference count has baseline value, which indicates that the blocks are not shared by other files. Also, all segment offsets are zero, indicating that the segment is a single cache page in size.

FIG. 4 illustrates an example extent list 184. As shown, the extent list 184 has two fields: a position that indicates a portion of compressed data 212 within the segment 182, and a length of the portion 212. The numbers shown in FIG. 4 are in units of bytes, but this is by no means a requirement.

What is not explicitly shown in the extent list 184 is an identifier of the portion 212. In this example, no such identifier is necessary because the order of the writes have been preserved throughout the compression and store process. The entries in the extent list 184 are in the same order as that of the logical addresses.

Figure 5:
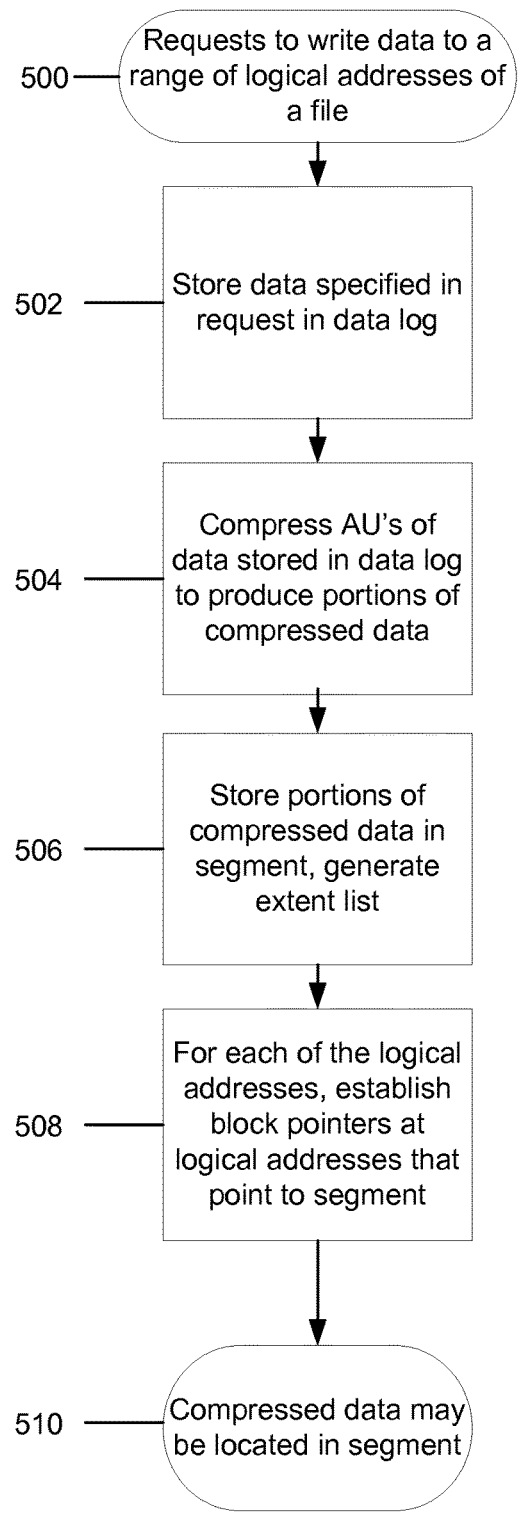
FIG. 5 is a flow chart illustrating an example read operation carried out within the electronic environment shown in FIG. 1.

FIG. 5 illustrates an example process of writing into a segment 182. The process begins at 500, when the SP 120 receives a request to write data to a range of logical addresses of a file. In response, at 502, the SP 120 stores the data specified in the request to the data log 150. The data is stored in the data log 150, the SP 120 in AU-sized chunks.

At 504, the SP 120 compresses each AU-sized chunk of data specified by the write request. The results of the compression are corresponding portions of compressed data 212. The portions are ordered by logical address, even if they appear differently in the data log 150.

At 506, the SP 120 stores the portions of compressed data 212 together in the segment 182 in order of logical address. The SP 120 also generates the extent list 184 based on results of the compression operations. In some arrangements, the SP 120 stores the extent list 184 in the first 512 bytes of the segment 182.

At 508, the SP 120 establishes block pointers 162. Specifically, the SP 120 writes the physical address of the segment in the block address field and indicates that the data being pointed to is compressed.

However, it should be understood that, if the block pointer already exists and is being shared with another file (as a non-baseline reference count), then the write results in a write split. In this case, the SP 120 allocates a new segment and stores the data there. Then, the SP 120 updates the address of the block pointer to point to the new segment.

At 510, the write is finished. The file system 160 may locate any portion of compressed data 212 using the block pointers 162 and the extent list 184.

Figure 6:
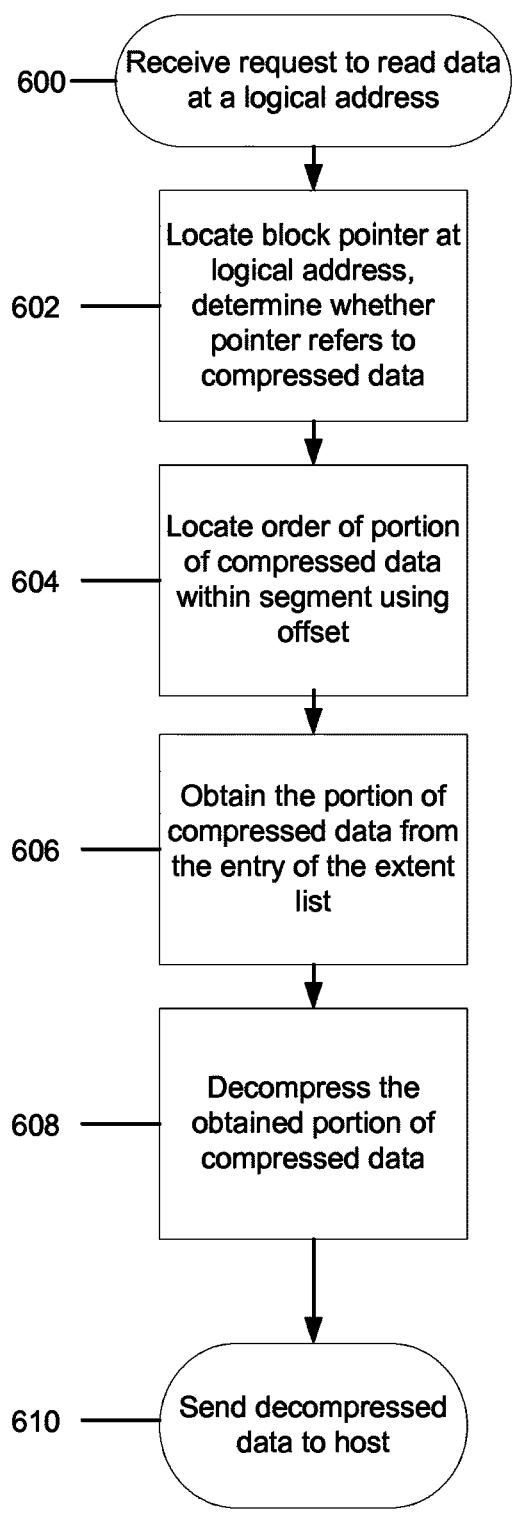
FIG. 6 is a flow chart illustrating an example overwrite of a data block carried out within the electronic environment shown in FIG. 1.

FIG. 6 illustrates a process of locating and reading a portion of compressed data 212 in response to a read request received at 600. The read request specifies a logical address at which data is to be accessed and returned to the requestor.

At 602, the SP 120 locates the relevant block pointer 162 at the specified logical address. The block pointer 162 in this case indicates that the data to be read is compressed.

At 604, the SP 120 determines the entry in the extent list 184 at which the SP 120 may find the portion of compressed data to be read. In this case, the SP 120 uses an offset provided by the sequential arrangement of the block pointers 162. That is, the SP 120 counts how many block pointers that come before the block pointer 162 point to the same physical address as does the current block pointer. From that count, the SP 120 knows which entry of the extent list to look in to find the portion of compressed data 212.

At 606, the SP 120 obtains the portions of compressed data 212 from the position and length values found in the entry determined from the offset.

At 608, the SP 120 performs a decompression operation on the obtained a portion of compressed data 212 to recover the AU-sized data chunk that arrived with the original write requests.

At 610, the SP 120 sends the newly decompressed data to the requestor.

Figure 7:
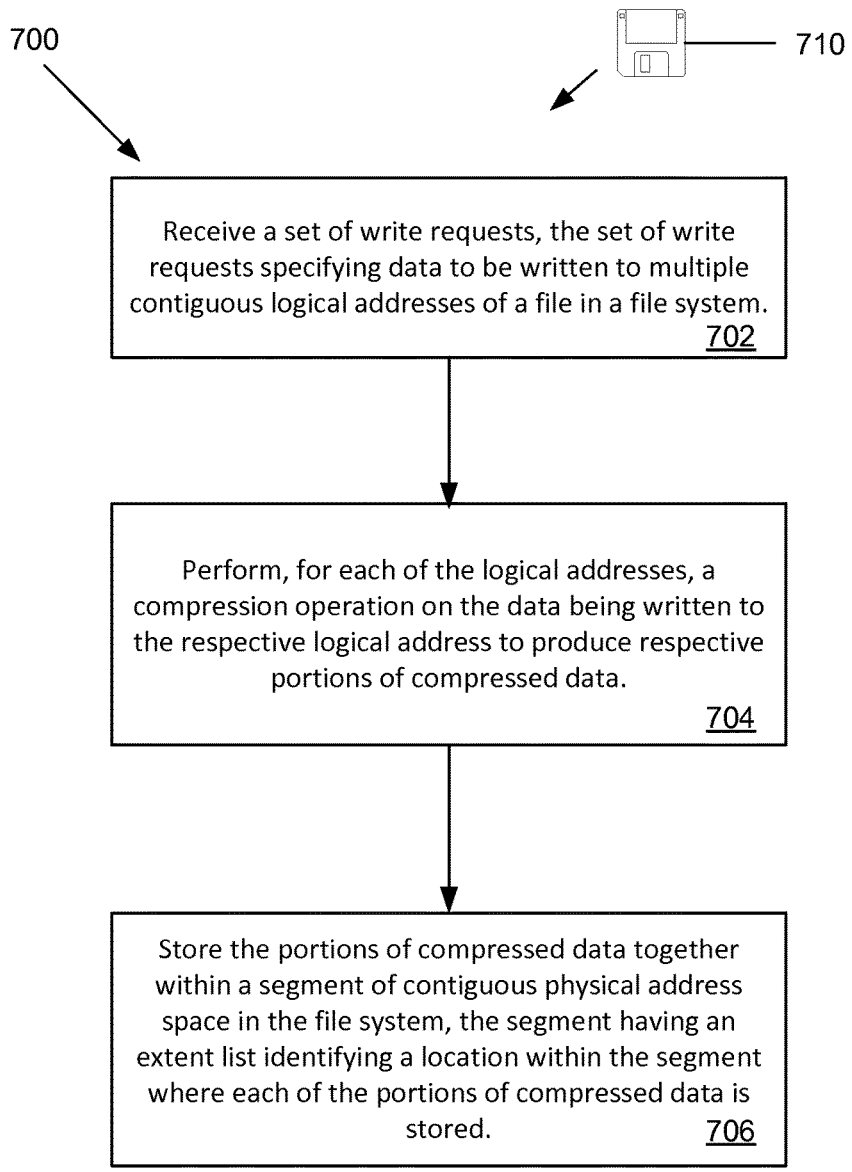
FIG. 7 is a flow chart illustrating an example method of processing the write requests within the electronic environment shown in FIG. 1.

FIG. 7 illustrates a method 700 of detecting performing inline compression on received data and storing resulting compressed data in segments of contiguous physical address space of a file system according to the improved techniques and provides a summary of some of the material presented above. The method 400 may be performed by the software constructs described in connection with FIGS. 1-3, which reside in the memory 130 of the SP 120 and are run by the set of processing units 124.

At 702, the SP 120 receives a set of write requests, the set of write requests specifying data to be written to multiple contiguous logical addresses of a file in a file system.

At 704, the SP 120 performs, for each of the logical addresses, a compression operation on the data being written to the respective logical address to produce respective portions of compressed data.

At 706, the SP 120 the portions of compressed data together within a segment of contiguous physical address space in the file system, the segment having an extent list identifying a location within the segment where each of the portions of compressed data is stored.

Improved techniques have been described for storing data received by a data storage system. The improved techniques involve performing inline compression on received data and storing resulting compressed data in segments of contiguous physical address space of a file system. Advantageously, the improved techniques greatly improve storage utilization by reducing or eliminating the need to store uncompressed data prior to compression.

Having described certain embodiments, numerous alternate embodiments or variations can be made. For example, file system 160 may support data blocks having a second AU size that is larger that the size of the data chunks. However, the size of the cache page size and therefore the size of the segment 182 remains the same, as a cache page is tied to the size of the data chunks.

Further, while the above examples are directed to inline compression, in which the compression operations are performed prior to storage in the non-volatile storage medium 180, in some arrangements the SP 120 may perform background compression operations after storage in the non-volatile storage medium 180.

Furthermore, it should be understood that some embodiments are directed to data storage apparatus 116 containing storage processor 120, which is constructed and arranged to process write requests in a data storage system. Some embodiments are directed to a process of processing write requests in a data storage system. Also, some embodiments are directed to a computer program product that enables computer logic to cause a computer to process write requests in a data storage system in a computing environment.

In some arrangements, storage processor 120 is implemented by a set of cores or other types of control/processing circuitry running software. In such arrangements, the software instructions can be delivered, within storage processor 120, either in the form of a computer program product 710, or simply instructions on disk or pre-loaded in memory 130 of data storage system 116, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

What is claimed is:

1. A method of managing data storage in a data storage system, the method comprising:

receiving, by the data storage system over a network, a set of write requests, the set of write requests specifying data to be written to multiple contiguous logical addresses of a file in a file system;

performing, for each of the logical addresses of the file in the file system, a compression operation on the data being written to the respective logical address to produce respective portions of compressed data;

storing the portions of compressed data together within a segment of contiguous physical address space in the file system, the segment having an extent list identifying a location within the segment where each of the portions of compressed data is stored;

establishing a set of block pointers in the file system for the multiple contiguous logical addresses of the file, the block pointers each pointing to the segment in the physical address space of the file system; and storing the extent list of the segment within the segment, wherein establishing the set of block pointers for the multiple contiguous logical addresses of the file includes (i) writing a single physical address of the segment in each of the set of block pointers and (ii) storing the set of block pointers in indirect blocks of the file system, and wherein the method further comprises flushing the data for each logical address to physical addresses in the file system, the physical addresses indicated by inodes and indirect blocks of the file system.

2. A method as in claim 1, wherein the single physical address of the segment identifies a primary block in the file system for which primary block metadata (BMD) is maintained.

3. A method as in claim 1, wherein receiving the set of write requests includes:

storing the data specified by the set of write requests in a data log; and sending an acknowledgment for each of the write requests once the data specified in the respective write request is stored in the data log, wherein performing the compression operation includes compressing the data for each logical address before the data is flushed from the data log.

4. A method as in claim 3, wherein the set of write requests specify number of allocation units (AUs) of data, wherein data is stored in the file system in physical blocks having a second AU size larger than the AU size, and wherein compressing the data stored in the data log includes separately compressing each of the number of AUs of data to produce the portions of compressed data.

5. A method as in claim 3, wherein the data log stores data in cache pages, each cache page having a predetermined cache page size; and wherein the segment has a size equal to an integer multiple, greater than zero, of the cache page size.

6. A method as in claim 5, wherein the multiple of the size of a cache page is greater than one, and wherein the method further comprises storing, in each of the set of block pointers, a segment offset indicating an offset in physical address space at which the segment is located.

7. A method as in claim 3, wherein the extent list includes a set of entries, each of the set of entries including (i) a beginning address within the segment of a portion of compressed data and (ii) a size of the portion of compressed data, wherein the method further comprises writing the set of entries to the extent list when storing the portions of the compressed data in the segment.

8. A method as in claim 7, further comprising:

receiving a read request from a host, the read request specifying a logical address of a file of the file system;

obtaining, from a block pointer for the logical address, a physical address of a segment and an offset identifying the portion of compressed data within the segment;

identifying the portion of compressed data within the segment based on the beginning address and size of the portion of compressed data written in the extent list at a position in the extent list based on the offset;

decompressing the identified portion of compressed data to produce decompressed data; and sending the decompressed data to the host to fulfill the read request.

9. A method as in claim 3, wherein the method further comprises storing, in each of the set of block pointers, an indicator indicating that the portion of data pointed to by that block pointer is compressed.

10. A method as in claim 9, wherein portions of the compressed data stored within the segment are shared with another file of the file system, and wherein the method further comprises:

receiving new write requests from a set of hosts, the new write requests specifying (i) the multiple contiguous logical addresses of the file and (ii) data to be written thereto;

performing the compression operation on the data specified by the new write requests to produce new portions of compressed data;

storing the new portions of compressed data together within a new segment of contiguous physical address space in the file system; and changing the block pointers established for the logical addresses to a physical address within the new segment of contiguous physical address space.

11. A method as in claim 3, further comprising storing, in each of the set of block pointers in the indirect blocks, a single bit that indicates whether a portion of data pointed to by that block pointer is compressed.

12. An apparatus configured to manage data storage in a data storage system, the apparatus comprising:

a network interface;

memory; and controlling circuitry coupled to the memory, the controlling circuitry being constructed and arranged to:

receive, over the network interface, a set of write requests, a set of write requests, the set of write requests specifying data to be written to multiple contiguous logical addresses of a file in a file system;

perform, for each of the logical addresses of the file in the file system, a compression operation on the data being written to the respective logical address to produce respective portions of compressed data; and store the portions of compressed data together within a segment of contiguous physical address space in the file system, the segment having an extent list identifying a location within the segment where each of the portions of compressed data is stored;

establish a set of block pointers for the multiple contiguous logical addresses of the file, the block pointers each pointing to the segment in the physical address space of the file system;

store the extent list of the segment within the segment;

wherein the controlling circuitry constructed and arranged to establish the set of block pointers for the multiple contiguous logical addresses of the file is further constructed and arranged to (i) write a single physical address of the segment in each of the set of block pointers and (ii) store the set of block pointers in indirect blocks of the file system; and wherein the controlling circuitry is further constructed and arranged to flush the data for each logical address to physical addresses in the file system, the physical addresses indicated by inodes and indirect blocks of the file system.

13. An apparatus as in claim 12, wherein the controlling circuitry constructed and arranged to receive the set of write requests is further constructed and arranged to:

store the data specified by the set of write requests in a data log, and send an acknowledgment for each of the write requests once the data specified in the respective write request is stored in the data log; and wherein the controlling circuitry constructed and arranged to perform the compression operation is further constructed and arranged to compress the data for each logical address before the data is flushed from the data log.

14. An apparatus as in claim 13, wherein the set of write requests specify a number of allocation units (AUs) of data, wherein data is stored in the file system in physical blocks having a second AU size larger than the AU size, and wherein the controlling circuitry constructed and arranged to compress the data stored in the data log is further constructed and arranged to separately compress each of the number of AUs of data to produce the portions of compressed data.

15. An apparatus as in claim 13, wherein the data log stores data in cache pages, each cache page having a predetermined cache page size; and wherein the segment has a size equal to an integer multiple, greater than zero, of the cache page size.

16. An apparatus as in claim 15, wherein the extent list includes a set of entries, each of the set of entries including (i) a beginning address within the segment of a portion of compressed data and (ii) a size of the portion of compressed data;

wherein the controlling circuitry is further constructed and arranged to write the set of entries to the extent list when storing the portions of the compressed data in the segment.

17. A non-transitory, computer-readable storage medium which stores executable code, which when executed by a client computer, causes the client computer to perform a method of managing data storage in a data storage system, the method comprising:

receiving, by the data storage system over a network, a set of write requests, the set of write requests specifying data to be written to multiple contiguous logical addresses of a file in a file system;

performing, for each of the logical addresses of the file in the file system, a compression operation on the data being written to the respective logical address to produce respective portions of compressed data;

storing the portions of compressed data together within a segment of contiguous physical address space in the file system, the segment having an extent list identifying a location within the segment where each of the portions of compressed data is stored;

establishing a set of block pointers in the file system for the multiple contiguous logical addresses of the file, the block pointers each pointing to the segment in the physical address space of the file system; and storing the extent list of the segment within the segment, wherein establishing the set of block pointers for the multiple contiguous logical addresses of the file includes (i) writing a single physical address of the segment in each of the set of block pointers and storing the set of block pointers in indirect blocks of the file system, and wherein the method further comprises flushing the data for each logical address to physical addresses in the file system, the physical addresses indicated by inodes and indirect blocks of the file system.

* * * * *